United States Patent
Bamberger et al.

(10) Patent No.: US 6,640,951 B2
(45) Date of Patent: Nov. 4, 2003

(54) ACTUATION SYSTEM FOR THE CLUTCH OF A MOTOR VEHICLE DRIVE TRAIN PROVIDED WITH AN AUTOMATIC TRANSMISSION, AND METHOD FOR CONTROLLING SUCH AN ACTUATION SYSTEM

(75) Inventors: Joachim Bamberger, Stockdorf (DE); Joachim Horn, München (DE); Peter Michau, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/115,842
(22) Filed: Apr. 3, 2002
(65) Prior Publication Data
US 2002/0139635 A1 Oct. 3, 2002

(30) Foreign Application Priority Data
Apr. 3, 2001 (DE) .......................... 101 16 544

(51) Int. Cl.$^7$ .............................. F16D 25/00
(52) U.S. Cl. .................. 192/85 R; 192/30 W; 477/174; 477/176; 477/74
(58) Field of Search ............................ 192/30 W, 85 R, 192/85 CA; 340/453; 701/67, 68; 477/176, 74, 78, 180, 174

(56) References Cited
U.S. PATENT DOCUMENTS

| | | | | |
|---|---|---|---|---|
| 4,561,530 A | * | 12/1985 | Parsons et al. ............. | 477/176 |
| 5,316,116 A | * | 5/1994 | Slicker et al. .............. | 477/181 |
| 5,378,211 A | * | 1/1995 | Slicker et al. .............. | 477/176 |
| 5,393,274 A | * | 2/1995 | Smedley ...................... | 477/74 |
| 5,413,542 A | * | 5/1995 | Jarvis ........................... | 477/84 |
| 5,439,428 A | * | 8/1995 | Slicker ........................ | 477/175 |
| 5,441,462 A | * | 8/1995 | Chan ........................... | 477/74 |
| 5,993,355 A | * | 11/1999 | Nordgard .................... | 477/174 |
| 6,059,691 A | * | 5/2000 | McDonald et al. ......... | 477/176 |
| 6,206,803 B1 | * | 3/2001 | Baer et al. ................... | 477/74 |
| 6,258,009 B1 | * | 7/2001 | Thomas et al. ............. | 477/109 |

FOREIGN PATENT DOCUMENTS

DE      44 34 111 A1      3/1996

* cited by examiner

Primary Examiner—Rodney H. Bonck
Assistant Examiner—Eric M. Williams
(74) Attorney, Agent, or Firm—Laurence A. Greenberg; Werner H. Stemer; Ralph E. Locher

(57) ABSTRACT

A clutch actuation system includes an actuator drive for actuating the clutch, and a position control circuit having a controller determining a position of the clutch and to which a position setpoint value is fed and a measurement signal, representing the position, of a sensor is fed as an actual value. A filter that filters interference oscillations out of the position signal is inserted into the position control circuit. The stop band of the filter depends adaptively on the rotational speed of the drive engine of the motor vehicle, in particular, the stop band corresponds to the speed.

18 Claims, 13 Drawing Sheets

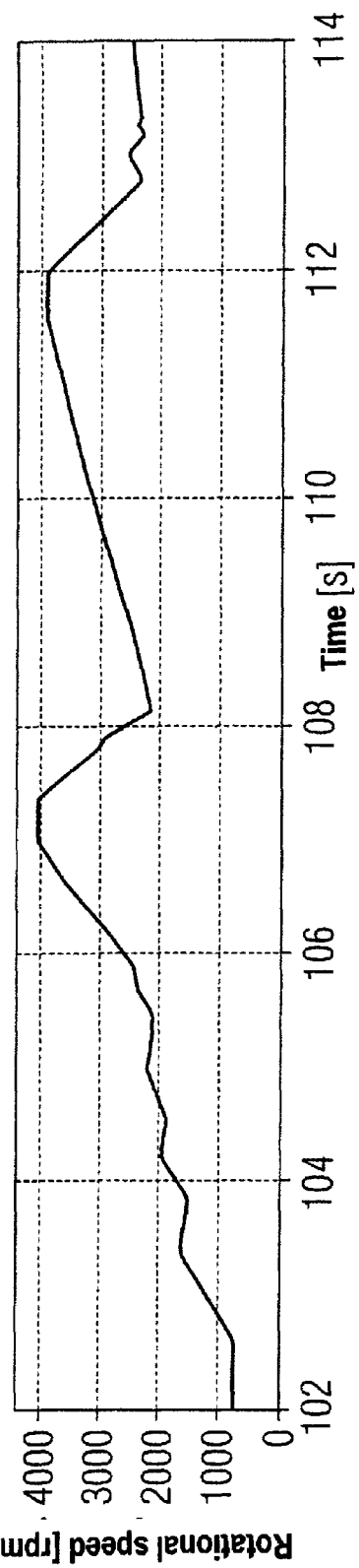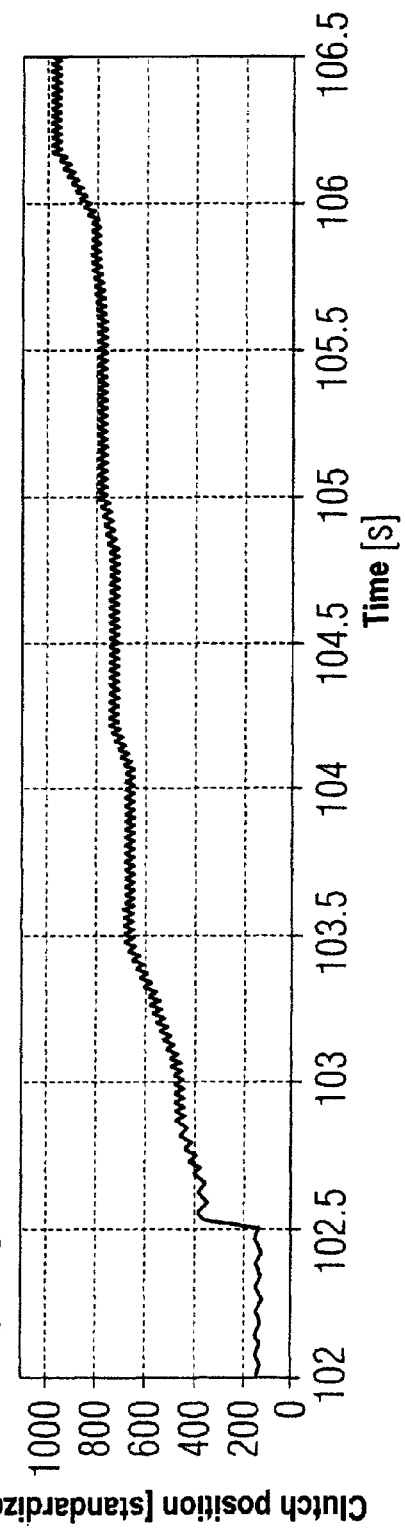

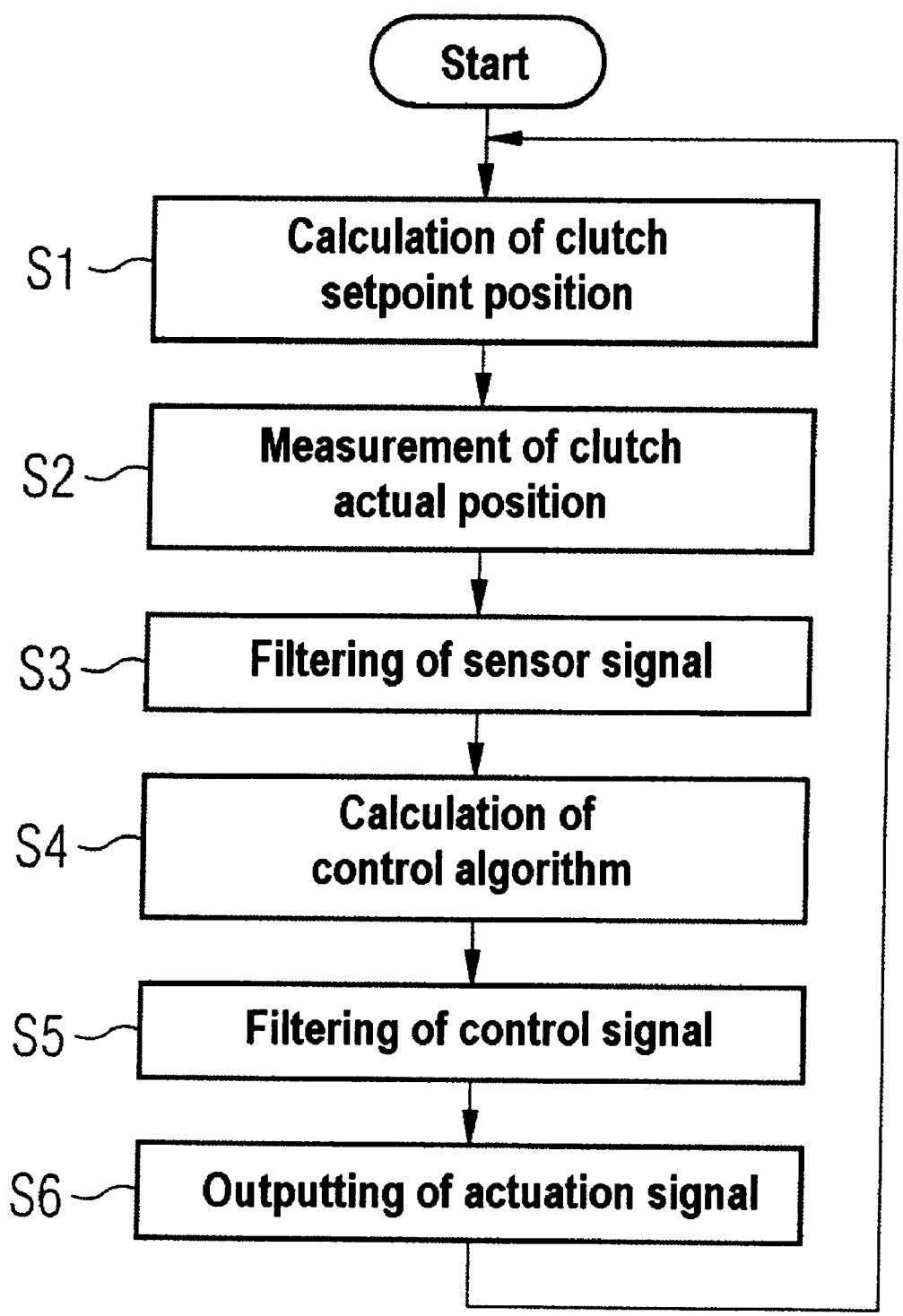

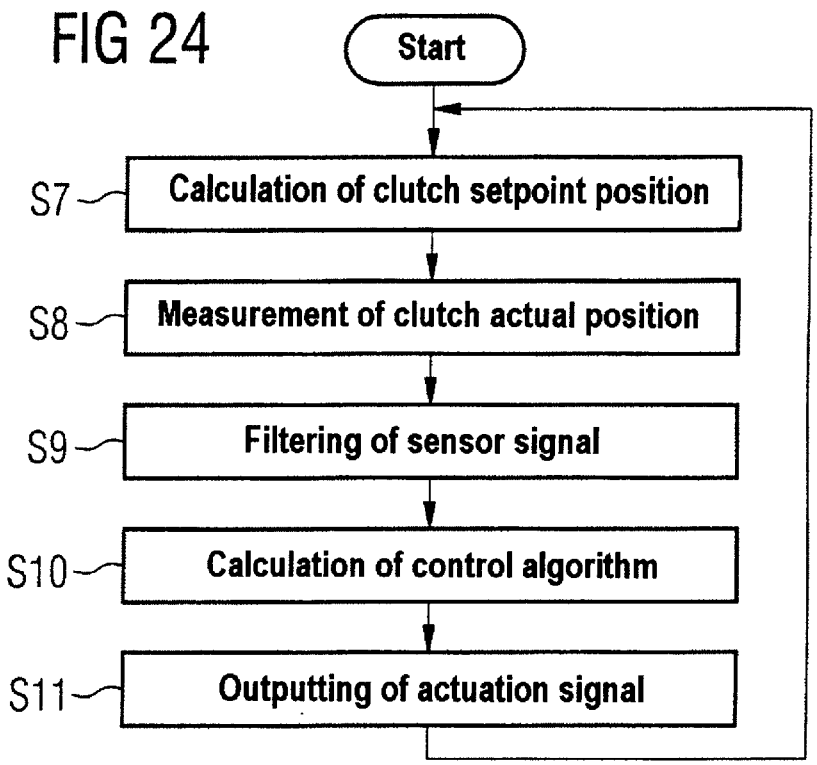
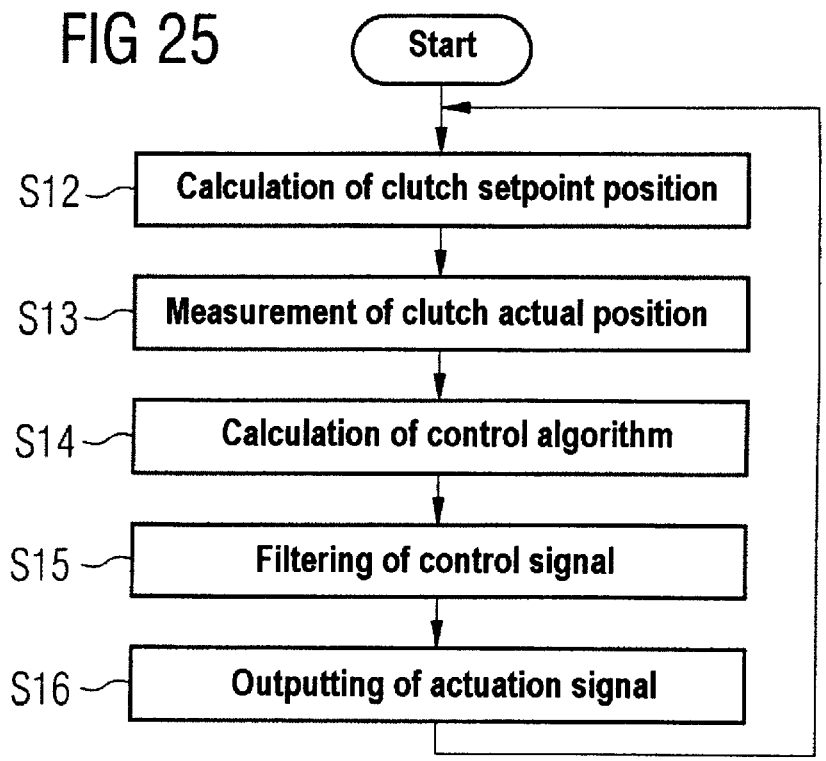

ACTUATION SYSTEM FOR THE CLUTCH OF A MOTOR VEHICLE DRIVE TRAIN PROVIDED WITH AN AUTOMATIC TRANSMISSION, AND METHOD FOR CONTROLLING SUCH AN ACTUATION SYSTEM

BACKGROUND OF THE INVENTION

Field of the Invention

The invention relates to an actuation system for the clutch of a motor vehicle drive train having an automatic transmission and to a method for controlling an actuation system for an automatic motor vehicle clutch with an electrohydraulic actuator drive for actuating the clutch. Such an actuation system for the clutch of a motor vehicle provided with an automatic transmission has an electrically controlled actuator drive for actuating the clutch, and a position control circuit that contains a position controller determining the position of the clutch and to which a setpoint value for the position and a measurement signal, representing the position, of a sensor are fed as actual values.

In addition to the conventional motor vehicle clutches that are actuated directly by the driver, automatically actuated clutches are being increasingly used in motor vehicles (see for example German Published, Non-Prosecuted Patent Application DE 44 34 111 A1, corresponding to U.S. Pat. No. 5,993,355 to Nordgaard). In electrohydraulic clutch actuation systems, the clutch position is measured to control the position. The measured signal contains oscillations with highly variable frequencies that lie in the typical frequency range of the control and, thus, lead to undesired control movements. Such movements increase, in particular, the oil requirements of the electrohydraulic clutch actuation system. In addition, the interference signal restricts the stability range of the control circuit and reduces the system dynamics that can be achieved.

SUMMARY OF THE INVENTION

It is accordingly an object of the invention to provide an actuation system for the clutch of a motor vehicle drive train provided with an automatic transmission, and method for controlling such an actuation system that overcomes the hereinafore-mentioned disadvantages of the heretofore-known devices and methods of this general type and that provides an actuation system for an automatic motor vehicle clutch in which negative influences of interference oscillations of the clutch position signal are avoided.

With the foregoing and other objects in view, there is provided, in accordance with the invention, a clutch actuation system for a motor vehicle having an engine connected to a drive train including a clutch, an automatic transmission, and an electrically controlled actuator drive for actuating the clutch, the actuation system including a position control circuit having a sensor sensing a position of the clutch and reproducing a position of the clutch with a position measurement signal, a controller determining the position of the clutch, the controller connected to the sensor and receiving a setpoint value for the position of the clutch and the position measurement signal as an actual position of the clutch, and a filter connected to the controller and filtering interference oscillations out of the position measurement signal, and the filter having a stop band adaptively dependent upon a rotational speed of the engine.

The advantages of the invention lie, in particular, in the fact that, with it, the energy requirements of electrically controlled clutch systems are effectively reduced, specifically both with electromechanically actuated clutches and electrohydraulically actuated clutches. In the case of the latter, in particular, the oil requirements are also reduced. The stability range of the control circuit is greater and higher system dynamics are achieved.

In accordance with another feature of the invention, the filter is a band stop filter having time-variable filter coefficients defined to present a stop frequency of the filter at the rotational speed of the engine.

In accordance with a further feature of the invention, the filter is a band stop filter having a stop band and a stop frequency corresponding to the rotational speed of the engine, and the stop band has a width less than or equal to approximately 30% of the stop frequency.

In accordance with an added feature of the invention, the filter is a Butterworth band stop filter of the second order.

In accordance with an additional feature of the invention, the filter is disposed between the controller and the actuator drive.

In accordance with yet another feature of the invention, the filter is disposed between the sensor and the controller.

In accordance with yet a further feature of the invention, the controller stores a characteristic diagram and filter coefficients are stored in the characteristic diagram as interpolation nodes for an interpolation.

With the objects of the invention in view, in a motor vehicle having an engine connected to a drive train including a clutch, an automatic transmission, and an electrically controlled actuator drive for actuating the clutch, there is also provided a clutch actuation system including a position control circuit having a sensor sensing a position of the clutch and reproducing a position of the clutch with a position measurement signal, a controller determining the position of the clutch, the controller connected to the sensor and receiving a setpoint value for the position of the clutch and the position measurement signal as an actual position of the clutch, and a filter connected to the controller and filtering interference oscillations out of the position measurement signal, and the filter having a stop band adaptively dependent upon a rotational speed of the engine.

With the objects of the invention in view, there is also provided a method for controlling an actuation system for an automatic motor vehicle clutch having an electrohydraulic actuator drive for actuating the clutch, including the steps of determining a position of the clutch with a position control circuit by feeding to the position control circuit set point values for the position of the clutch and a measured position signal of a sensor representing the position of the clutch as an actual value and filtering out interference oscillations from the position signal with a filter having a stop band dependent adaptively upon a rotational speed of a drive engine of the motor vehicle.

In accordance with yet an added mode of the invention, a band stop filter is provided as the filter and time-variable filter coefficients of the filter are defined to present a stop frequency of the filter at the rotational speed of the drive engine of the motor vehicle.

In accordance with yet an additional mode of the invention, a band stop filter is provided as the filter, filter coefficients are defined to have a stop frequency of the filter correspond to the rotational speed of the drive engine, and a width of the stop band is defined to be not more than approximately 30% of the stop frequency.

In accordance with a concomitant mode of the invention providing a band stop filter as the filter, defining filter coefficients to have a stop frequency of the filter correspond to the rotational speed of the drive engine, and defining a width of the stop band to be less than or equal to approximately 30% of the stop frequency.

Other features that are considered as characteristic for the invention are set forth in the appended claims.

Although the invention is illustrated and described herein as embodied in an actuation system for the clutch of a motor vehicle drive train provided with an automatic transmission, and method for controlling such an actuation system, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 19 is a graph indicating a profile of the engine speed associated with the signals of FIGS. 17 and 18;

FIGS. 20, 21, and 22 are graphs enlarging excerpts from FIGS. 17, 18 and 19, respectively; and FIGS. 23, 24, and 25 are flowcharts of three different programs for controlling the clutch actuation systems according to FIGS. 2, 7, and/or 8.

DESCRIPTION OF THE PREFERRED EMBODIMENTS

Figure 1:
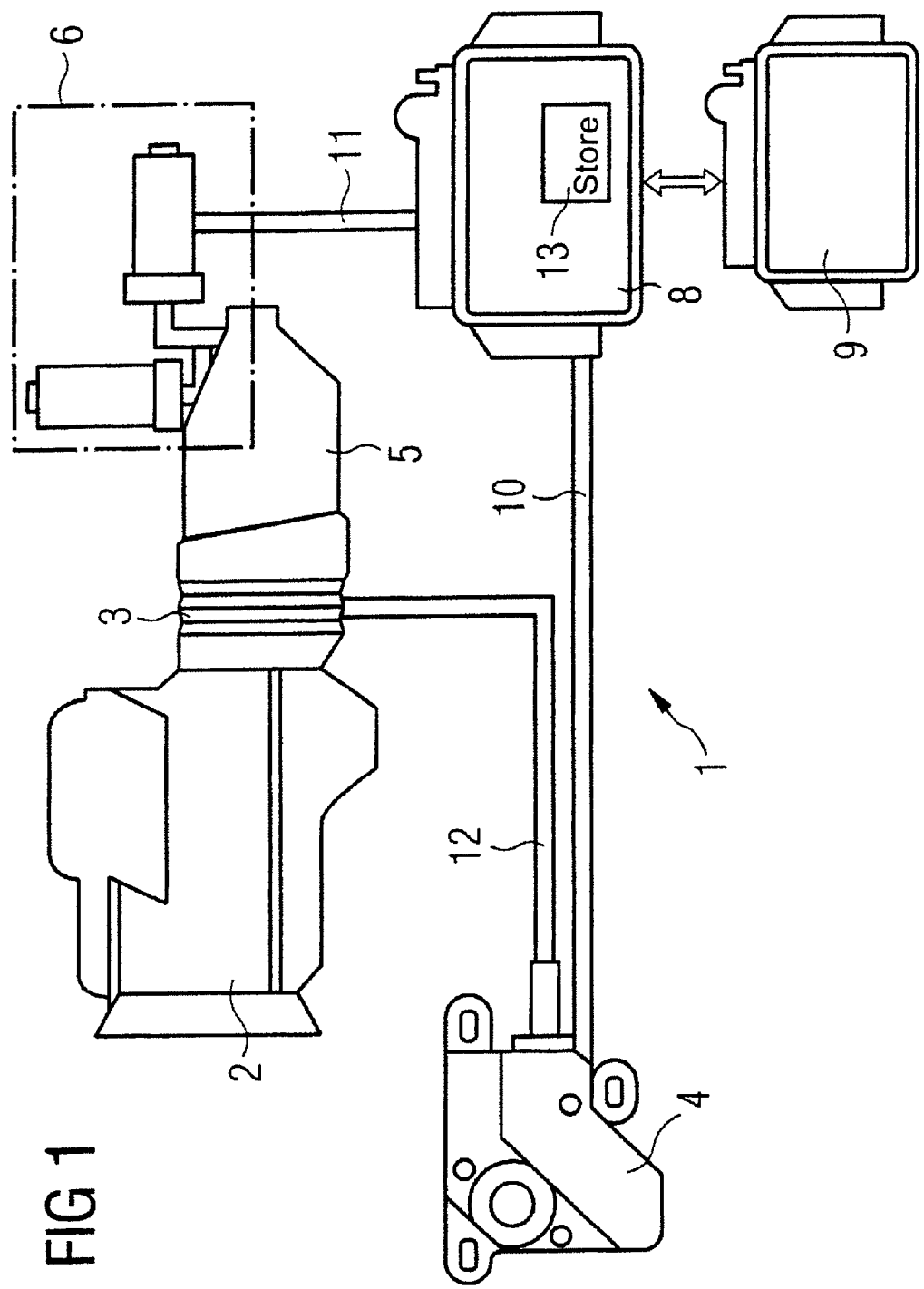
FIG. 1 is a diagrammatic illustration of a motor vehicle drive train with an automatically actuated clutch according to the invention.

Referring now to the figures of the drawings in detail and first, particularly to FIG. 1 thereof, there is shown a motor vehicle drive train 1 having—insofar as it is significant for the present invention—the following components: an engine 2, a clutch 3, a clutch actuator (also referred to below as actuator element or actuator drive for the clutch) 4, a transmission 5, a transmission actuator 6, an electronic controller 8 for the actuator element 4 and the transmission actuator 6, and an engine controller 9. The electronic controller 8 is connected to the actuator element 4 by control lines and signal lines 10 and to the transmission actuator 6 by control lines and signal lines 11.

The actuation element 4 can be embodied as an electromotively driven actuator or as a hydraulically driven actuator. In the exemplary embodiment described here, a hydraulic actuator element 4 is used that is connected to the clutch 3 by a force transmission configuration 12, which is embodied, for example, as a pressure line. The electronic controller 8 also contains schematically illustrated characteristic diagram stores 13 in which various characteristic curves for controlling the clutch 3 and the transmission 5 are stored.

Although the transmission 5 is embodied structurally as a manually shifted transmission in the motor vehicle drive train 1 in the present exemplary embodiment, the shift operations are carried out automatically, and the clutch 3 is actuated under the control of the electronic controller 8 as soon as the controller initiates a shift operation. Such a transmission is referred to as an automatic or automated (manually shifted) transmission, ASG for short. The clutch controller according to the invention can be used with automatically controlled clutches (referred to as EKS) for customary manually shifted transmissions, which are actuated as soon as the driver grips the shift lever to carry out a gear speed change, or else with fully automatic transmissions that are however generally provided with a wet clutch or hydrodynamic power transmission.

The simplified block circuit diagram (FIG. 2) of a clutch actuation system 14 that forms a control circuit has a controller 15, to which are fed a setpoint position x_setp supplied by a setpoint value transmitter 16 and a sensor signal x_sensor. In response, the controller 15 generates at its signal output an actuation signal in the form of a control current or coil current I, which is transmitted to a clutch position system 17, provided with an electromagnetic hydraulic valve, and acts there as a valve current I_valve.

The valve current I_valve brings about setting of the clutch position x_z through the clutch position system 17. The position x_z also corresponds to the position of a non-illustrated prior art central disengaging device of the clutch or of a hydraulic clutch actuating cylinder with which the clutch is actuated. Because the clutch actuating cylinder is also generally in the prior art, it is not described individually here.

The clutch position can be influenced by faults, for example, mechanical oscillations of the clutch system, which are caused by engine vibrations. At the same time there may be a fault in the measurement itself, caused, for example, by mechanical oscillations of the sensor housing or by inductive or capacitive induction of external electrical faults.

The output signal of the clutch position system 17 is the true position x_z of the clutch actuating signal or of the clutch 3. As a result of the described interference effects, an interference variable—represented here by an interference element 18—is added to this position and results in a falsified actual value x_z_tilde of the clutch position. The value x_z_tilde is measured by a sensor 19 and its output signal is fed back to the second input of the controller 15 as a sensor signal x_sensor.

Figure 2:
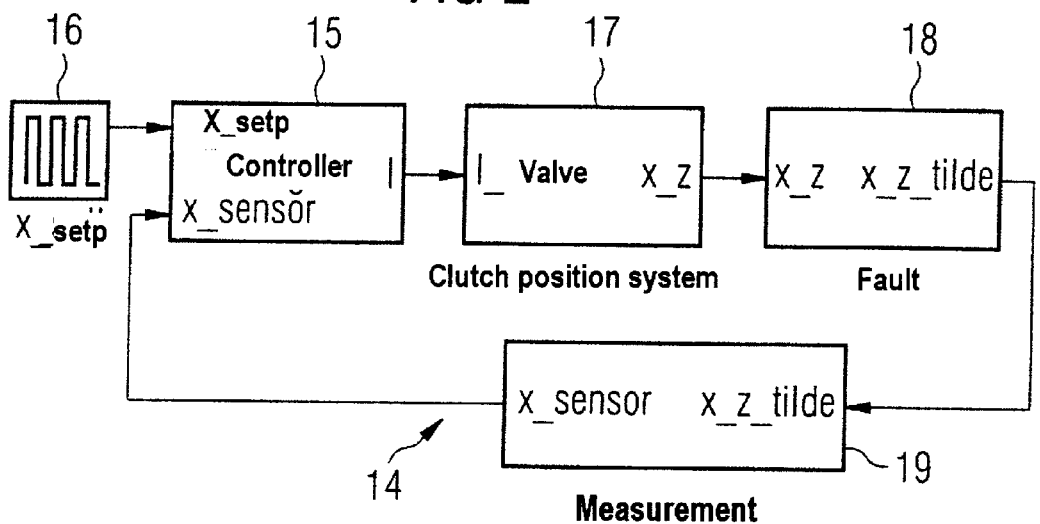
FIG. 2 is a block circuit diagram of a clutch actuation system for the motor vehicle drive train of FIG. 1.
Figure 3:
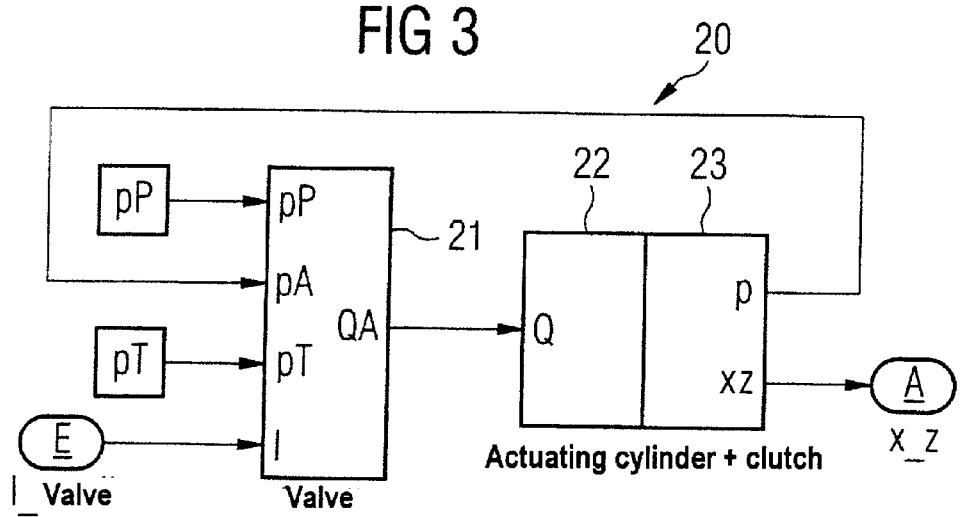
FIG. 3 is a block circuit diagram of the clutch actuation system of FIG. 2.

A more detailed structural model 20 of the controlled system, that is to say, of the clutch position system 17 from FIG. 2, is shown in FIG. 3. A hydraulic valve 21 receives, as input variables, a system pressure pP, a working pressure pA, a tank pressure pT and—through a signal input E—the valve current or coil current I_valve. Its output signal QA thus controls a volume flow Q, which builds up a pressure in an actuating cylinder 22, which pressure positions a clutch 23, that is to say, moves it into a desired position xz that corresponds to the true position or the actual position x_z of the system (output A). The pressure p that is built up in the actuating cylinder 22 of the clutch 23 corresponds to the working pressure pA, and it also reacts on the valve 21.

Figure 4:
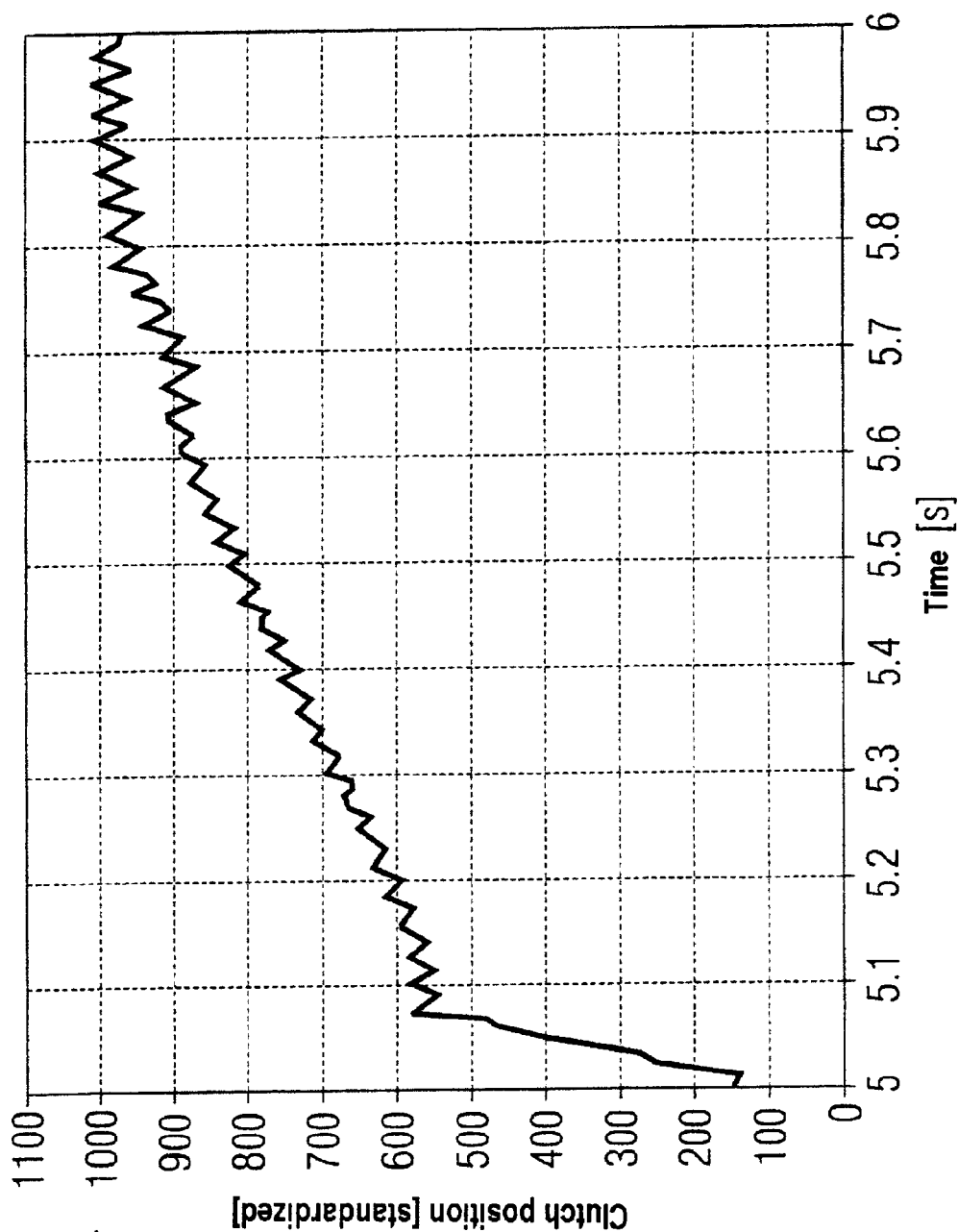
FIG. 4 is a graph indicating a signal of a clutch position sensor according to the invention.

FIG. 4 shows the signal of the clutch position sensor 19 of a motor vehicle with an automatic transmission system. A clutch position that is standardized over time is illustrated. The illustration permits the clutch to approach its contact point rapidly at a position of 580, and in the rest of the profile shows a closing operation of the clutch. It is clearly apparent that relatively high frequency oscillations are superimposed on the variation of the clutch position over time, that is to say, that the signal of the clutch position sensor is subject to interference.

Customary position control algorithms typically detect such relatively high frequency oscillation as a deviation from the setpoint trajectory and attempt to compensate the oscillations. As a result, an oscillation of the same frequency is produced in the actuation variable, in the instant example, the electrical current I valve of the solenoid valve. As a result, more or less strong valve movements are generated for each setting of the position control algorithm. These movements of the valve lead to a considerably enlarged consumption of hydraulic oil and, thus, to a greater consumption of power, and also to greater wear of the oil pump due to longer pump running times.

Figure 5:
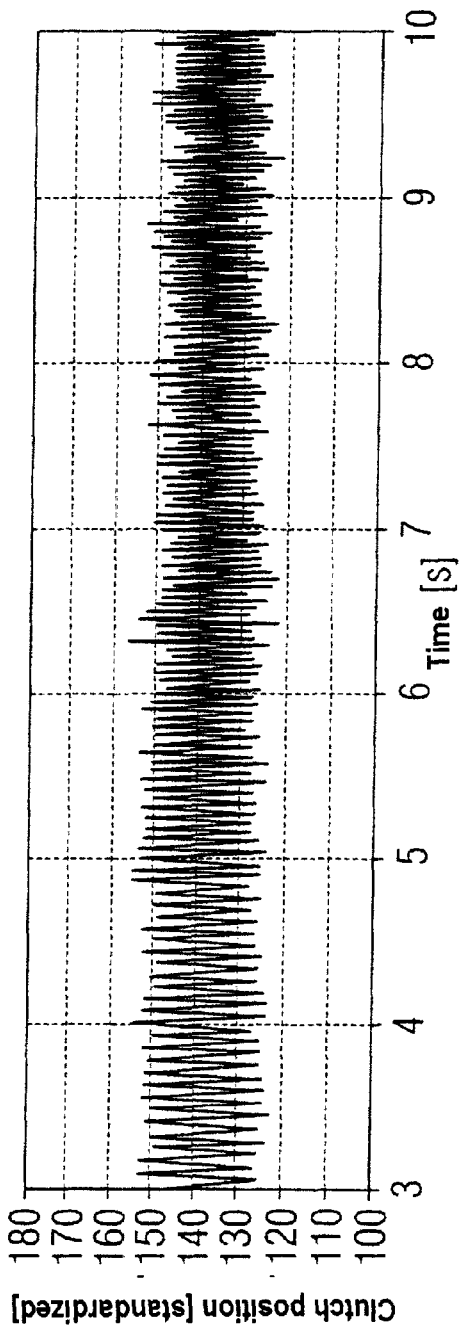
FIG. 5 is a graph indicating a variation of the clutch position measured over time during a driving trial according to the invention.
Figure 6:
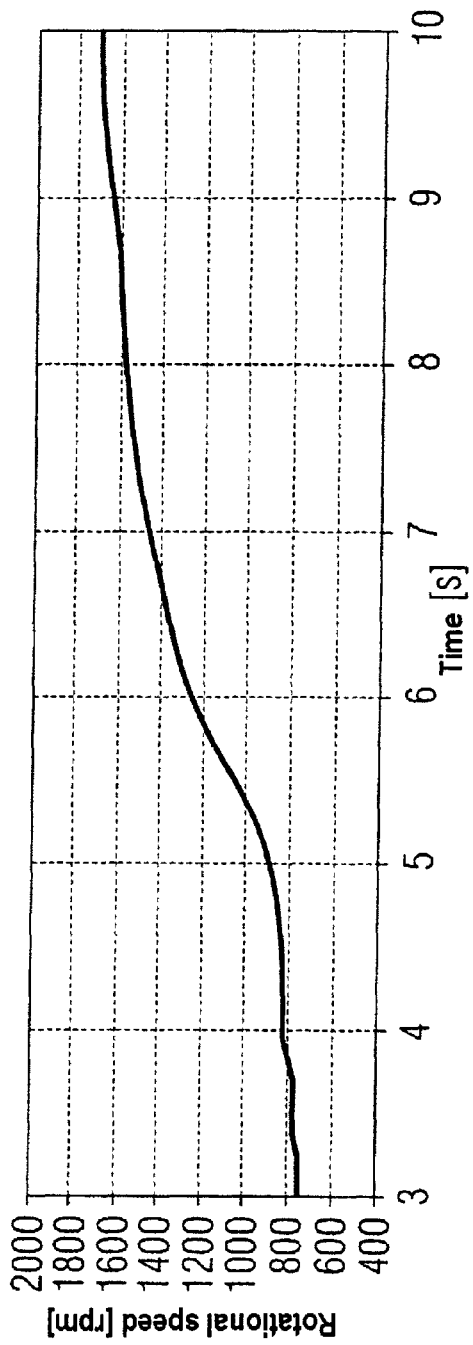
FIG. 6 is a graph indicating a variation of the engine speed measured over time during the driving trial of FIG. 5.

In driving trials with a plurality of trial vehicles, it has been detected that the characteristic of the faults is dependent on the engine speed. The clutch position is illustrated in FIG. 5 and the associated engine speed from a driving trial is illustrated in FIG. 6. The setpoint value of the position controller was constant during the measurement, and the engine speed was slowly increased from 800 rpm to 1700 rpm. It is clearly apparent that the high frequency oscillation in the position signal changes its frequency with the engine speed n_eng.

A precise analysis of the sensor signal has shown that the frequencies of the oscillations in the steady-state condition, that is to say, at a constant engine speed, correspond precisely to integral multiples of the engine speed. The dominant portion of the oscillations is associated with the fundamental frequency, and the oscillation frequency corresponds to the engine speed.

Figure 7:
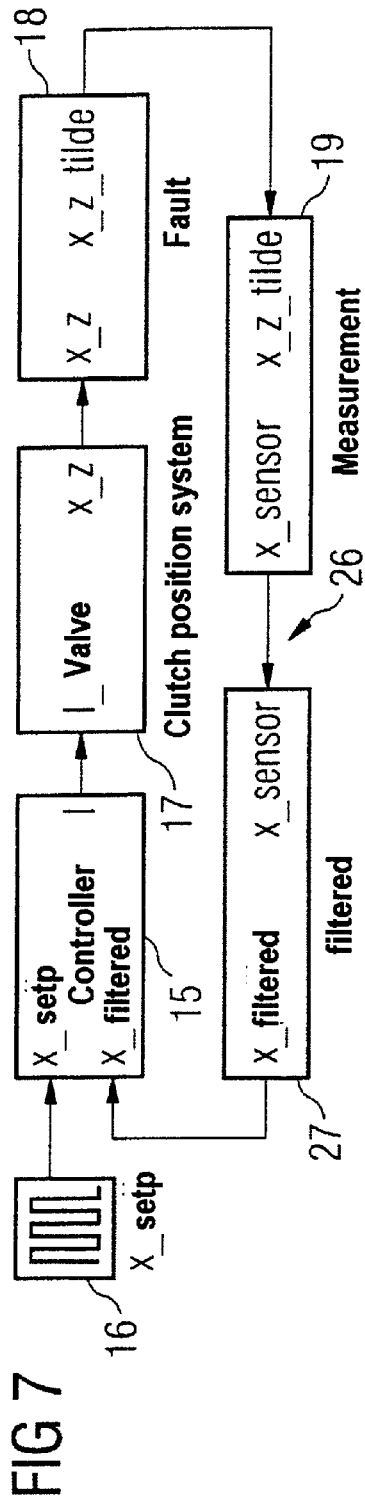
FIG. 7 is a block circuit diagram of a clutch actuation system according to the invention.

In a clutch actuation system 26 according to the invention shown in FIG. 7, a digital filter 27 is inserted between the output of the sensor 19 and the second input, or actual value input, of the controller 15, the digital filter 27 being embodied, for example, as a band stop filter and being used to filter the sensor signal. The time-variable filter coefficients of the filter 27 are continuously selected such that the stop band of the filter is located at the engine speed. As a result, the oscillation portions of the sensor signal are filtered out without perceptively influencing the useful portion of the signal.

Figure 8:
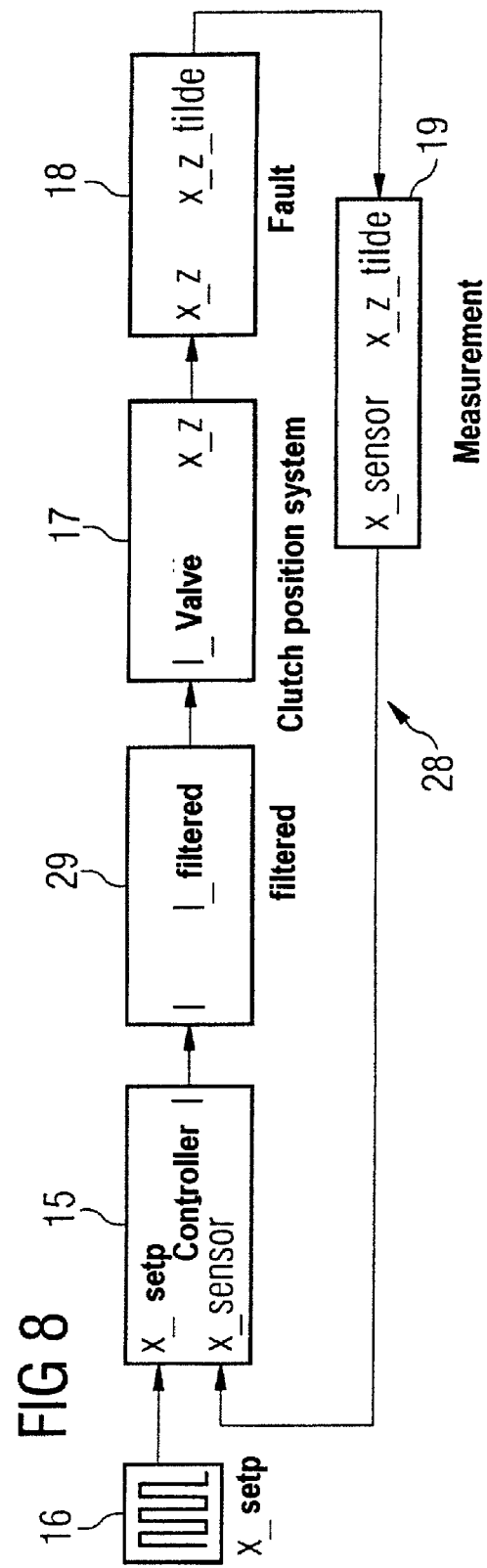
FIG. 8 is a block circuit diagram of a further clutch actuation system according to the invention.
Figure 9:
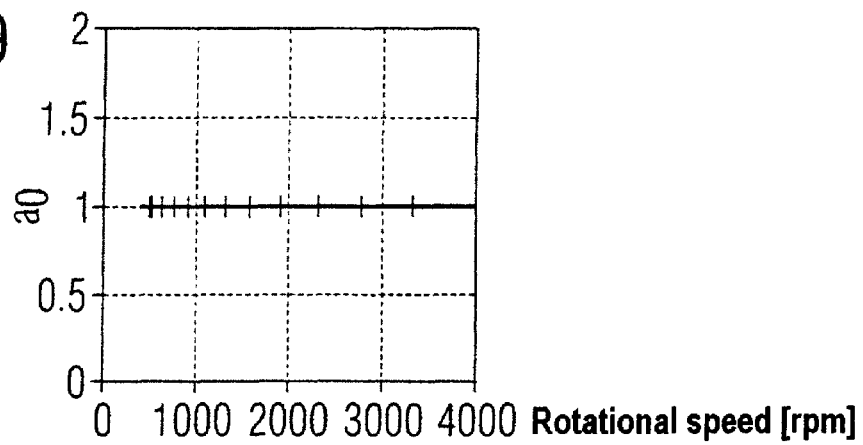
FIGS. 9 to 14 are graphs indicating a dependence of time-variable filter coefficients on the rotational speed according to the invention.
Figure 10:
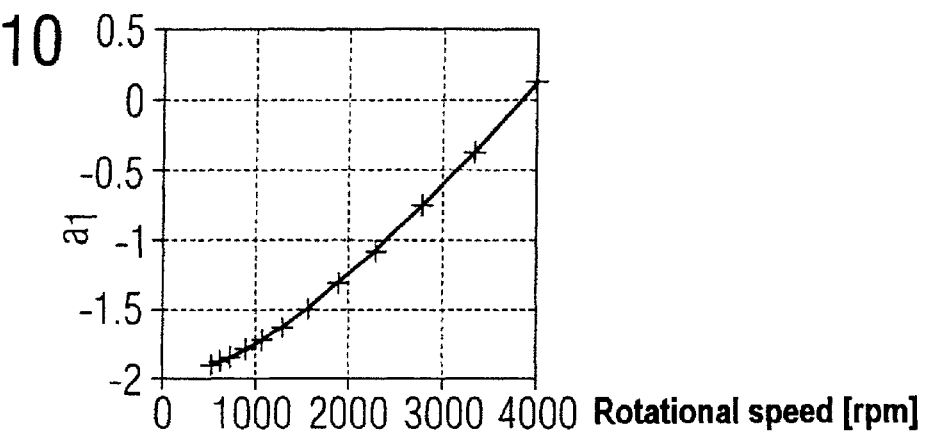
Figure 11:
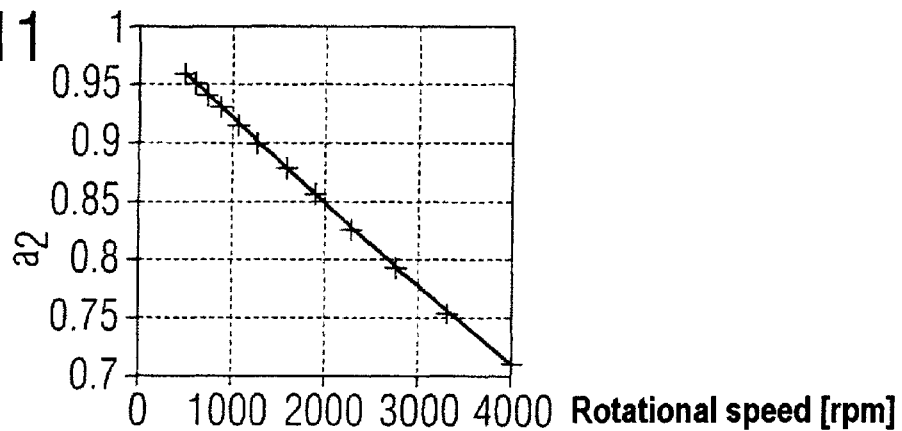
Figure 12:
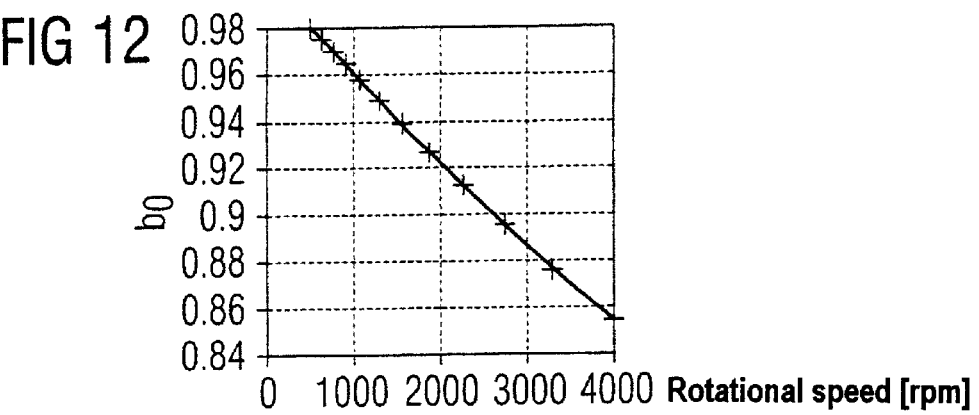
Figure 13:
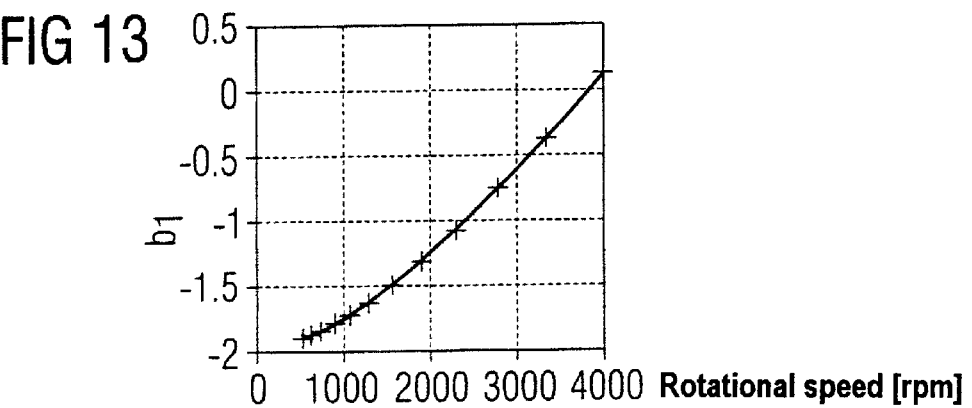
Figure 14:
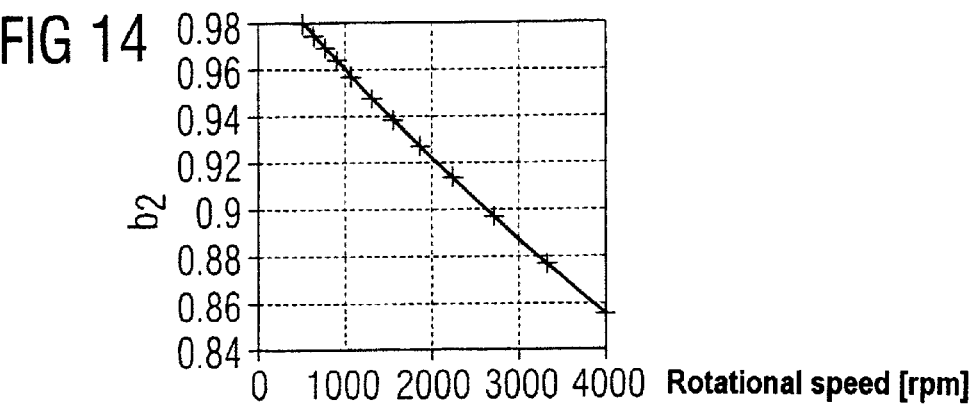

In a further clutch actuation system 28 shown in FIG. 8, the output signal of the controller 15, that is to say, the valve current signal I_valve, is filtered with a band stop filter 29. However, even with a linear control algorithm, system characteristics are obtained here that are slightly different from those of the clutch actuation system 26 because the filtering also acts on the setpoint value.

The adaptive filters as a function of the rotational speed 27, 29 are embodied in the present exemplary embodiments as symmetrical Butterworth band stop filters of the second order (Butterworth filters are disclosed in prior art specialist literature). In principle, the stop frequency $f_{stop}$—and, thus, the stop band of the filter—depends adaptively on the engine speed n_eng, specifically in the sense that it rises as the engine speed increases and drops as the engine speed decreases. As a result, the oscillation portions of the sensor signal are filtered out without perceptibly influencing the useful portion of the signal. In the present exemplary embodiment, the stop frequency corresponds to the engine speed. The width of the stop band is not more than approximately 30% of the stop frequency. In one preferred exemplary embodiment, it is defined as $0.2\ f_{stop}$. The filter equation is:

$$a_0 x_k = -a_1 x_{k-1} - a_a x_{k-2} + b_0 u_k + b_1 u_{k-1} + b_2 u_{k-2},$$

where:

$u_k$ corresponds to the unfiltered sensor signal;

$x_k$ corresponds to the filtered sensor signal at the time k; and $a_0, a_1, a_2, b_0, b_1, b_2$ are the associated time-variable filter coefficients.

The filter coefficients are to be newly determined at each time increment as a function of the engine speed. To avoid a continuous costly calculation of the coefficients, the functional dependence on time for each coefficient is calculated in advance and is illustrated as an interpolated characteristic curve and stored in the characteristic diagram store 13. The dependence of the filter coefficients $a_0, a_1, a_2, b_0, b_1, b_2$ on the rotational speed and their representation as linearly interpolated characteristic curves are apparent in FIGS. 9 to 14. The filter coefficients serve as interpolation nodes for the interpolation—which is linear in the present example.

Figure 15:
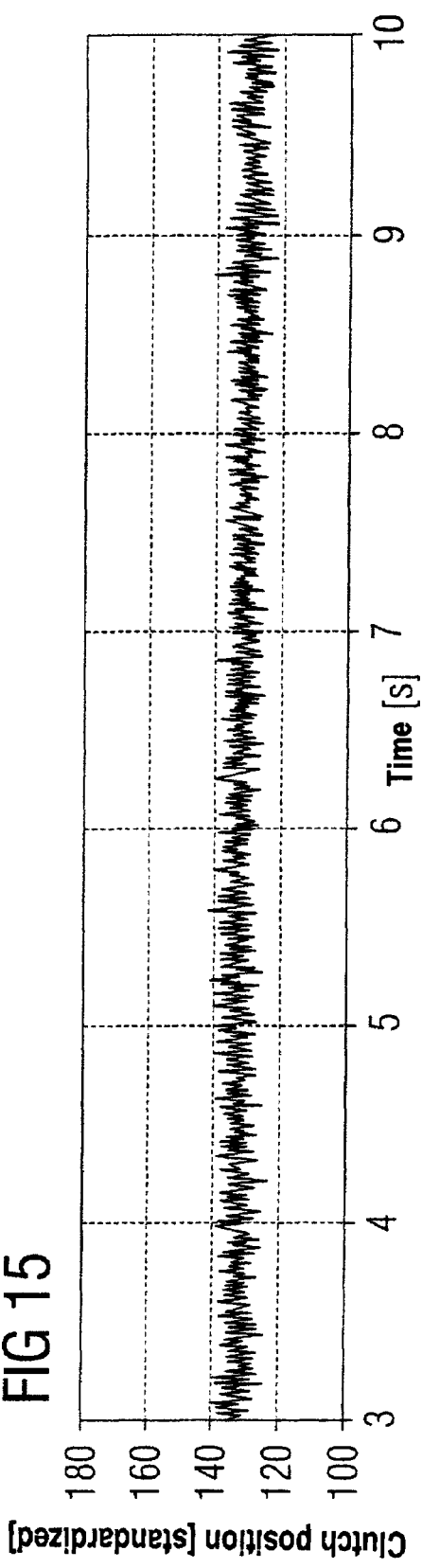
FIG. 15 is a graph indicating a variation over time of a position signal filtered adaptively as a function of the rotational speed according to the invention.
Figure 16:
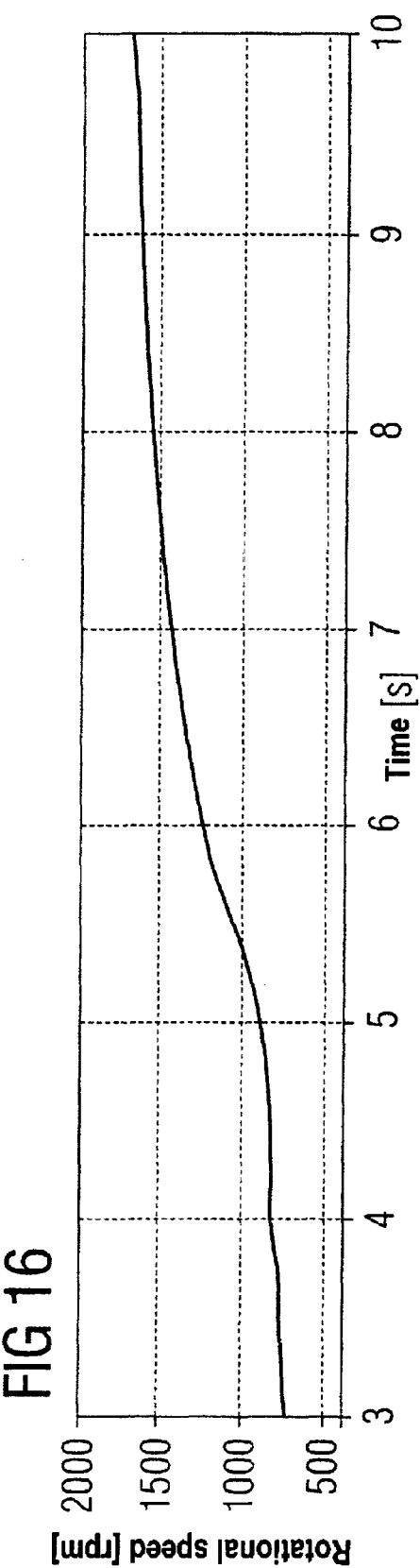
FIG. 16 is a graph indicating a profile of the engine speed associated with the filtered position signal of FIG. 15.

FIG. 15 shows the variation over time of the position signal x filtered that is filtered adaptively as a function of the rotational speed, and FIG. 16 shows the associated profile of the engine speed. A comparison with FIG. 5 shows that the faults during the entire profile are significantly reduced by the adaptive filtering as a function of the rotational speed.

Figure 17:
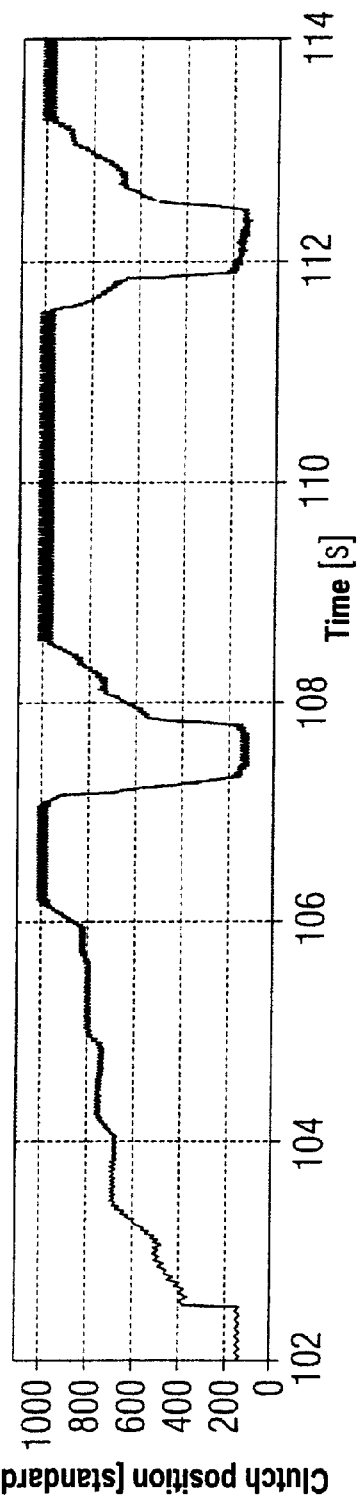
FIG. 17 is a graph indicating a variation of the measured clutch position over time during different gearshift operations according to the invention.
Figure 18:
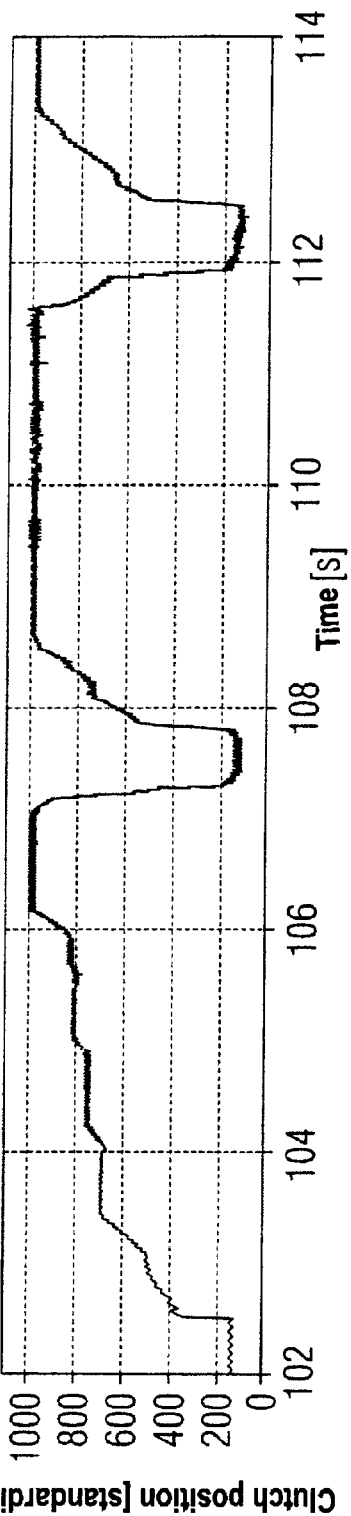
FIG. 18 is a graph indicating a variation over time of the position signal that is filtered adaptively as a function of the rotational speed, during different gearshift operations, according to the invention.

FIGS. 17, 18, and 19 show the variation over time of the measured clutch position x_sensor, of the position signal x filtered that is filtered adaptively as a function of the rotational speed, or of the associated engine speed during a plurality of gearshift operations. Here, too, it is apparent that the adaptive filtering as a function of the rotational speed significantly reduces the faults during the entire gearshift operations.

Figure 21:
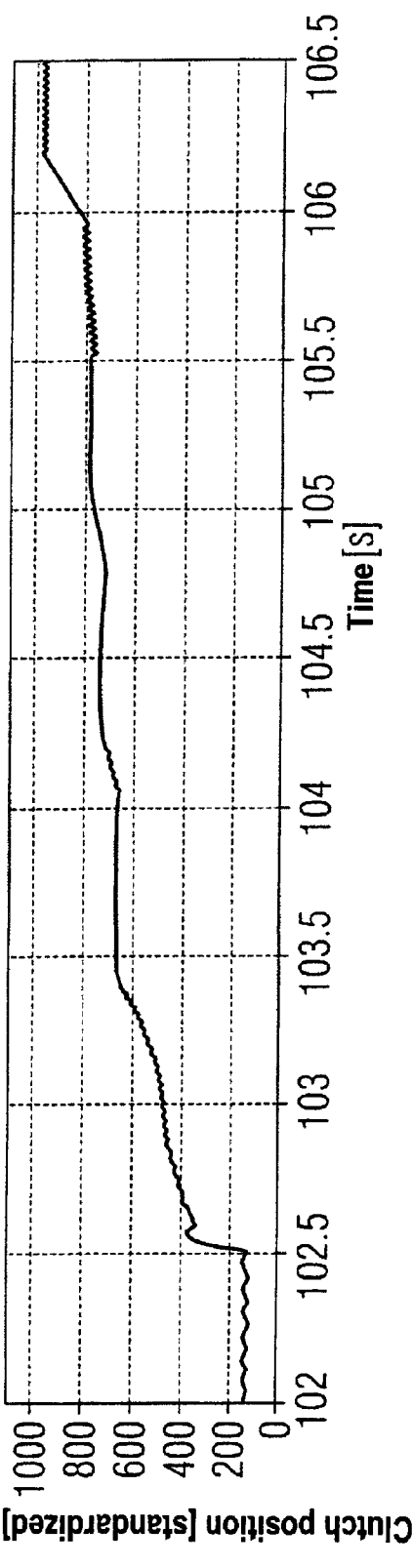
Figure 22:
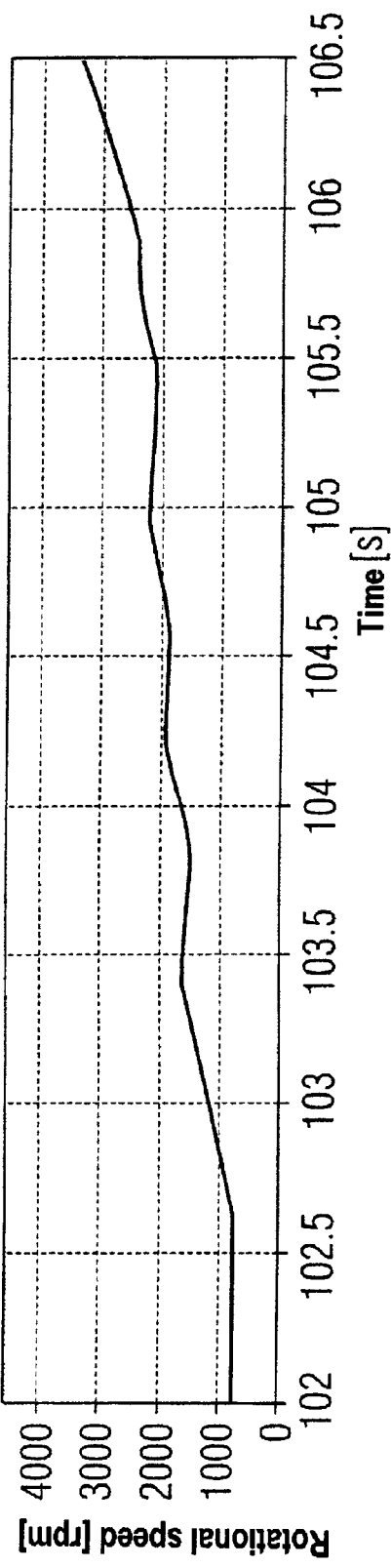

FIGS. 20, 21, and 22 show an enlargement of an excerpt from FIGS. 17, 18, and 19. The measured clutch position, the position signal that is filtered adaptively as a function of the rotational speed, or the associated engine rotational speed are illustrated as the clutch rapidly approaches its contact point and during a subsequent slip phase of the clutch.

A comparison of a filtering of the clutch position signal to precisely determined filter coefficients and of filtering with approximated coefficients has shown that the maximum deviation is less than 1, and, thus—referred to the maximum value of 1000—less than 1 per thousand. It can, thus, be disregarded. In FIGS. 4, 5, 15, 17, 18, 20, and 21, the values of the clutch position are plotted in standardized form, that is to say, referred to their maximum value, on the ordinate.

A first program, shown in FIG. 23, for controlling the clutch actuation system in which the measurement signal and the control signal are filtered has the following steps:

start: as soon as a gearshift operation is initiated by the electronic controller 8 (FIG. 1), in a step;

S1: the controller 8 calculates a clutch setpoint position x_setp. Then, in a step;

S2: the clutch actual position x_z is measured. In a step;

S3: the sensor signal that represents the clutch actual position x_z is filtered. In a step;

S4: the coil current I_valve that serves as an actuation signal is calculated with the control algorithm. In a step;

S5: the control signal I is filtered. Finally, in a step;

S6: the actuation signal I_valve is output to the valve 21.

Thus, a program run is processed and the program is cyclically repeated.

A second program, shown in FIG. 24, for controlling the clutch actuation system in which the measurement signal is filtered has the following steps:

Start: as soon as a gearshift operation is initiated by the electronic controller 8 (FIG. 1), in a step;

S7: it calculates a clutch setpoint position x_setp. Then, in a step;

S8: there is a measurement of the clutch actual position x_z. In a step;

S9: the sensor signal that represents the clutch actual position x_z is filtered. In a step;

S10: the coil current I_valve that serves as the actuation signal is calculated with the control algorithm. Finally, in a step;

S11: the actuation signal I valve is output to the valve 21.

A program run is thus processed and the program is cyclically repeated.

A third program, shown in FIG. 25, for controlling the clutch actuation system in which the control signal is filtered has the following steps:

Start: as soon as a gearshift operation is initiated by the electronic controller 8 (FIG. 1), in a step;

S12: it calculates a clutch setpoint position x_setp. Then, in a step;

S13: there is a measurement of the clutch actual position x_z. In a step;

S14: the coil current I_valve serving as the actuation signal is calculated with the control algorithm. In a step;

S15: the control signal is filtered. Finally, in a step;

S16: the actuation signal I_valve is output to the valve 21.

A program run is, thus, processed and the program is cyclically repeated.

We claim:

1. A clutch actuation system for a motor vehicle having an engine connected to a drive train including a clutch, an automatic transmission, and an electrically controlled actuator drive for actuating the clutch, the actuation system comprising:

a position control circuit having:
a sensor sensing a position of the clutch and reproducing a position of the clutch with a position measurement signal;
a controller determining the position of the clutch, said controller connected to said sensor and receiving:
a setpoint value for the position of the clutch; and
said position measurement signal as an actual position of the clutch; and
a filter connected to said controller and filtering interference oscillations out of said position measurement signal; and said filter having a stop band adaptively dependent upon a rotational speed of the engine.

2. The actuation system according to claim 1, wherein said filter is a band stop filter having time-variable filter coefficients defined to present a stop frequency of said filter at the rotational speed of the engine.

3. The actuation system according to claim 1, wherein:
said filter is a band stop filter having:
a stop band; and
a stop frequency corresponding to the rotational speed of the engine; and
said stop band has a width less than or equal to approximately 30% of said stop frequency.

4. The actuation system according to claim 3, wherein:
said controller stores a characteristic diagram; and
filter coefficients are stored in said characteristic diagram as interpolation nodes for an interpolation.

5. The actuation system according to claim 1, wherein said filter is a Butterworth band stop filter of the second order.

6. The actuation system according to claim 1, wherein said filter is disposed between said controller and the actuator drive.

7. The actuation system according to claim 1, wherein said filter is disposed between said sensor and said controller.

8. In a motor vehicle having an engine connected to a drive train including a clutch, an automatic transmission, and an electrically controlled actuator drive for actuating the clutch, a clutch actuation system comprising:

a position control circuit having:
a sensor sensing a position of the clutch and reproducing a position of the clutch with a position measurement signal;
a controller determining the position of the clutch, said controller connected to said sensor and receiving:
a setpoint value for the position of the clutch; and
said position measurement signal as an actual position of the clutch; and
a filter connected to said controller and filtering interference oscillations out of said position measurement signal; and said filter having a stop band adaptively dependent upon a rotational speed of the engine.

9. The actuation system according to claim 8, wherein said filter is a band stop filter having time-variable filter coefficients defined to present a stop frequency of said filter at the rotational speed of the engine.

10. The actuation system according to claim 8, wherein:
said filter is a band stop filter having:
a stop band; and
a stop frequency corresponding to the rotational speed of the engine; and
said stop band has a width less than or equal to approximately 30% of said stop frequency.

11. The actuation system according to claim 10, wherein:

said controller stores a characteristic diagram; and filter coefficients are stored in said characteristic diagram as interpolation nodes for an interpolation.

12. The actuation system according to claim 8, wherein said filter is a Butterworth band stop filter of the second order.

13. The actuation system according to claim 8, wherein said filter is disposed between said controller and the actuator drive.

14. The actuation system according to claim 8, wherein said filter is disposed between said sensor and said controller.

15. A method for controlling an actuation system for an automatic motor vehicle clutch having an electrohydraulic actuator drive for actuating the clutch, which comprises:

determining a position of the clutch with a position control circuit by:

feeding to the position control circuit set point values for the position of the clutch and a measured position signal of a sensor representing the position of the clutch as an actual value; and filtering out interference oscillations from the position signal with a filter having a stop band dependent adaptively upon a rotational speed of a drive engine of the motor vehicle.

16. The method according to claim 15, which further comprises:

providing a band stop filter as the filter; and defining time-variable filter coefficients of the filter to present a stop frequency of the filter at the rotational speed of the drive engine of the motor vehicle.

17. The method according to claim 15, which further comprises providing a band stop filter as the filter;

defining filter coefficients to have a stop frequency of the filter correspond to the rotational speed of the drive engine; and defining a width of the stop band to be not more than approximately 30% of the stop frequency.

18. The method according to claim 15, which further comprises providing a band stop filter as the filter;

defining filter coefficients to have a stop frequency of the filter correspond to the rotational speed of the drive engine; and defining a width of the stop band to be less than or equal to approximately 30% of the stop frequency.

* * * * *